(12) United States Patent
Nuutinen et al.

(10) Patent No.: US 7,336,698 B2
(45) Date of Patent: Feb. 26, 2008

(54) INTERFERENCE CANCELLATION IN RECEIVER OF RADIO SYSTEM

(75) Inventors: Jukka Nuutinen, Oulu (FI); Kari Pajukoski, Oulu (FI); Kari Horneman, Oulu (FI)

(73) Assignee: Nokia Corporation, Espoo (FI)

( * ) Notice: Subject to any disclaimer, the term of this patent is extended or adjusted under 35 U.S.C. 154(b) by 734 days.

(21) Appl. No.: 10/421,943

(22) Filed: Apr. 24, 2003

(65) Prior Publication Data

US 2004/0013174 A1    Jan. 22, 2004

(30) Foreign Application Priority Data

Apr. 24, 2002  (FI) ................... 20020794

(51) Int. Cl.
*H04B 1/00* (2006.01)
(52) U.S. Cl. ................. 375/144; 375/148; 455/296; 455/63.1
(58) Field of Classification Search ................ 375/144, 375/148, 346, 348, 150, 343, 349; 455/63.1, 455/296, 278.1
See application file for complete search history.

(56) References Cited

U.S. PATENT DOCUMENTS 6,115,409 A * 9/2000 Upadhyay et al. .......... 375/144
6,282,233 B1 * 8/2001 Yoshida ..................... 375/148
2003/0125046 A1 * 7/2003 Riley et al. ................. 455/456

FOREIGN PATENT DOCUMENTS

| CN | 1242126 A | 1/2000 |
|----|-----------|--------|
| EP | 0 982 872 A2 | 3/2000 |
| WO | WO 01/56183 A1 | 8/2001 |

OTHER PUBLICATIONS

Wen-Sheng Hou; Li-Mei Chen; Bor-Sen Chen; "Adaptive narrowband interference rejection in DS-CDMA systems: a scheme of parallel interference cancellers" IEEE journal on Selected Areas in Communications, vol. 19, Issue 6, Jun. 2001 pp. 1103-1114.*
Wireless Personal Communications No. 16 "Joint Iterative Multiuser and Narrowband Interference Suppression in Coded Asynchronous DS-CDMA Channels." © 2001.
XP-000922108: "Joint Iterative MMSE Multiuser Detection and Narrowband Jammer Suppression in Coded DS-CDMA Channels." © 1999.

(Continued)

*Primary Examiner*—David C. Payne
*Assistant Examiner*—Aslan Ettehadieh
(74) *Attorney, Agent, or Firm*—Squire, Sanders & Dempsey, LLP (57) ABSTRACT

The invention relates to a receiver in a spread spectrum system, comprising reception means for receiving a spread spectrum signal. The receiver comprises interference cancellation means configured to cancel multiuser interference and external interference from the received spread spectrum signal in one or more interference cancellation stages. The invention further relates to an interference cancellation method in a spread spectrum system.

14 Claims, 3 Drawing Sheets

OTHER PUBLICATIONS

XP-000968044: "Adaptive Fuzzy Interference Cancellation for CDMA Communication Systems." © 2000.

Hou W-S et al.: "Adaptive Narrowband Interference Rejection in DS-CDMS Systems: A Scheme of Parallel Interference Cancellers" IEEE Journal on Selected Areas In Communications, IEEE INC. New York, US, vol. 19, No. 6, Jun. 2001, pp. 1103-1114.

Kitano T. et al.: "Hardware Design of Filter Bank-Based Narrowband/Wideband Interference Canceler for Overlaid TDMA/CDMA Systems" VTC 2000-Spring. 2000 IEEE 51st. Vehicular Technology Conference Proceedings. Tokyo, Japan, May 15-18, 2000, IEEE Vehicular Technology Conference, New York, NY: IEEE, US, vol. 2 of 3. pp. 1095-1099.

\* cited by examiner

PRIOR ART

INTERFERENCE CANCELLATION IN RECEIVER OF RADIO SYSTEM

BACKGROUND OF THE INVENTION

1. Field of the Invention

The invention relates to interference cancellation in a receiver of a radio system.

2. Description of the Related Art

Figure 1:
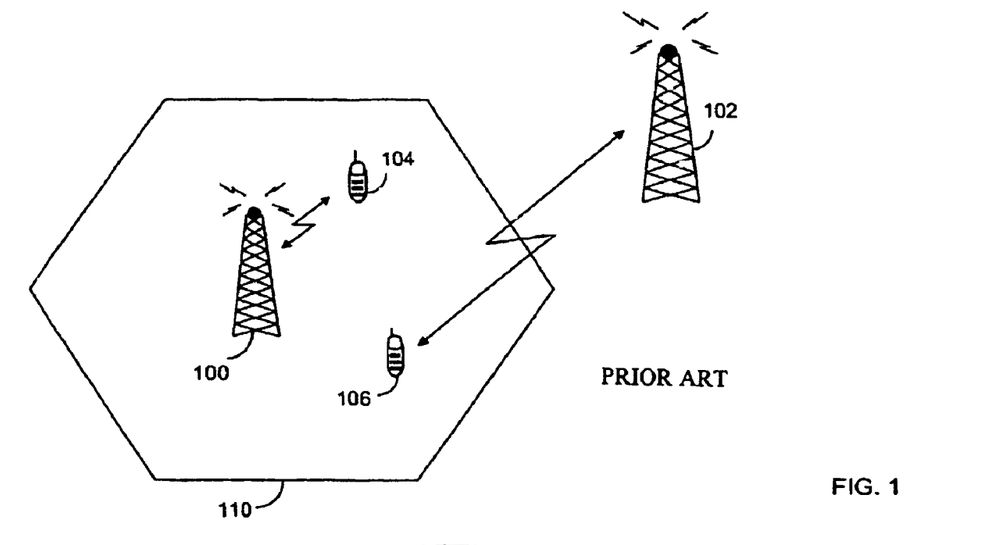
FIG. 1 shows the already-explained situation involving two adjacent radio systems.

Mobile communication systems and the number of users being on the increase, the mobile communication systems must increasingly often be located near each other's frequency bands, i.e. guard bands between the systems must be narrowed down. The inevitable result is that interferences caused by radio systems to each other will be on the increase, which should be taken into account when designing the systems. The situation can be illustrated by FIG. 1, wherein two radio systems operate within the same geographical area. A base transceiver station 100 belongs to a first radio system and serves a terminal device 104. A base transceiver station 102, in turn, belongs to a second radio system and serves a terminal device 106. A terminal device 106 residing in the coverage area 110 of the base transceiver station 100 is far away from the base transceiver station 102 serving it, which means that it is compelled to use a high transmission power. The transmission of the terminal 104 using a low transmission power experiences significant interference caused by the transmission of the terminal device 106 belonging to the second system.

External interference, such as signal energy leaking from a neighbouring system, is cancelled in broadband receivers e.g. by using FFT (Fast Fourier Transformation), TFD (Time Frequency Distribution) or an adaptive filter. Known interference cancellation solutions often require that an interference signal should be easily detectable. The performance of external interference cancellation algorithms is usually sufficient if the ISR (Interference to Signal Ratio) is of the order of 20 dB or the SNR (Signal to Noise Ratio) is of the order of 10 to 20 dB. In many operating situations, however, the external interference is weak, the interference to signal ratio being of the order of 1 dB, in which case the performance of the interference cancellation algorithms intended for cancelling external interference is very poor. In addition, in many operation situations noise is strong, which makes a signal difficult to detect from among the noise.

SUMMARY OF THE INVENTION

An object of the invention is thus to present an improved method for receiving a spread spectrum signal in a radio system, the method comprising receiving a spread spectrum signal containing user signals at a receiver of the radio system. The method comprises subjecting the received spread spectrum signal to one or more interference cancellation stages comprising one or more multiuser interference cancellation stages and one or more external interference cancellation stages.

The invention further relates to a receiver in a spread spectrum system, comprising reception means for receiving a spread spectrum signal. The receiver comprises interference cancellation means configured to cancel multiuser interference and external interference from the received spread spectrum signal in one or more interference cancellation stages.

The invention thus relates to a method and a receiver for receiving a spread spectrum signal in a radio system. The solution is applied e.g. to a receiver which has a second radio system within its geographical operation area and in an adjacent or overlapping operating frequency band. Such a situation occurs e.g. when both a second generation GSM/1900 (Global System for Mobile Communication) system and a third generation UMTS (Universal Mobile Telecommunications System) system based on a WCDMA (Wideband Code Division Multiple Access) standard operate within a frequency area of approximately 1900 MHz. For example, if the communication system under examination is the UMTS, the interference caused by the users of the system to each other is called multiuser interference, part of the multiuser interference originating from a user's own cell and part from the neighbouring cells, while a GSM signal is called external interference. It is possible to cancel multiuser interference coming from the user's own cell since all users of the cell must be detected at a base transceiver station receiver, so the users of one's own cell are known.

The signal to be detected is e.g. a spread spectrum signal of the WCDMA (Wideband CDMA) system, containing user signals spread by several spreading codes of different users. The system may also be a hybrid system, such as a system employing both a code division and a time division multiple access method.

In the solution of the invention, the received spread spectrum signal is subjected to multiuser interference and external interference cancellation procedures. In an embodiment, multiuser interference cancellation is carried out prior to external interference cancellation. This is advantageous particularly in situations wherein the interference to signal ratio (ISR) is low, since the algorithms intended for cancelling external interference have better performance when the effect of the signal to be detected is reduced. In an embodiment, external interference is cancelled prior to multiuser interference cancellation. This is advantageous particularly in a situation involving strong interference wherein the signal to noise ratio (SNR) is low in the received signal, since methods intended for cancelling multiuser interference have better performance after the external interference has been cancelled.

In a spread spectrum system, the receiver is e.g. a rake-type receiver wherein a unique branch, i.e. a finger, can be allocated to receive each multipath component. The receiver of the invention is implemented e.g. in a base transceiver station of a mobile communication system, wherein the spreading codes of the users using the system are known, thus enabling multiuser interference to be cancelled.

The solution of the invention enables good performance in signal reception to be achieved, which is emphasized in a radio system experiencing weak interference from an adjacent, second radio system, or strong noise.

BRIEF DESCRIPTION OF THE DRAWINGS

The invention is now described in closer detail in connection with preferred embodiments and with reference to the accompanying drawings, in which.

DETAILED DESCRIPTION OF THE PREFERRED EMBODIMENTS

Figure 2:
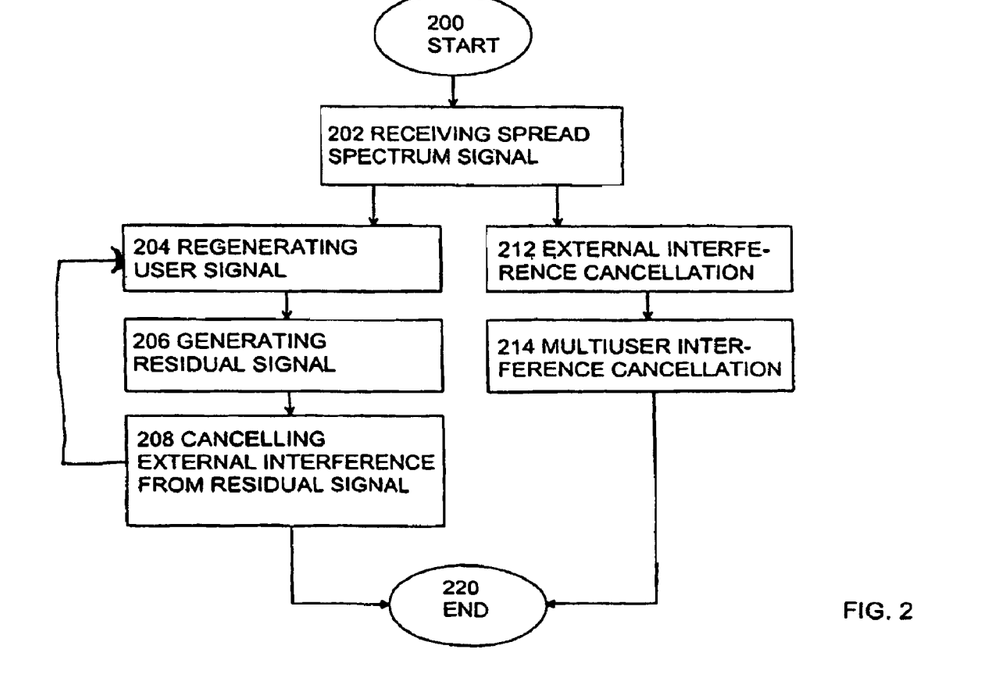
FIG. 2 shows a preferred embodiment of the method.

In the following, the invention will be described with reference to the accompanying drawings. FIG. 2 shows a preferred embodiment of the method. A spread spectrum signal is received 202 at a receiver. First, multiuser interference is cancelled 204 from the received spread spectrum signal in one or more interference cancellation stages. The method for cancelling multiuser interference may be e.g. parallel interference cancellation PIC, serial interference cancellation SIC, a combination thereof, or a corresponding known method. In terms of performance and complexity, single stage PIC may sometimes be a usable receiver type. In practice, however, there may be two or three stages since up to at least three stages, signal estimates to be generated from user signals improve. One stage of the parallel interference cancellation typically comprises the following stages: despreading a user signal, generating user signal estimates, regenerating user signals and generating a residual signal.

In principle, the generation of a residual signal in the PIC method described in method step 206 may be carried out in at least two different ways: one such way comprises generating a combination signal from the user signals of all users, the combination signal being subtracted from the received spread spectrum signal. The residual signal thus generated is conveyed to the next interference cancellation stage wherein the user signals are re-despread from the residual signal. The re-despread user signals are added user- and branch-specifically to the user- and branch-specific signals generated in the previous stage. In a second way, the residual signal is generated such that in the detection of a particular user signal, user signals other than the user signal to be detected are combined into a combination signal and subtracted from the received signal in order to generate a residual signal. The user signal is detected from the residual signal and the user signal generated in the previous stage is added to the signal thus provided. In an embodiment, the process does not move from the multiuser interference cancellation routine to the external interference cancellation routine until the ISR exceeds a preset threshold value. As far as the optimal performance of the algorithms for external interference cancellation is concerned, the threshold value to be set may be e.g. 20 dB, but it is obvious that the threshold value may also be set differently, depending e.g. on the reception environment.

External interference is cancelled 208 from the residual signal by using blind interference cancellation, utilizing e.g. FFT, TFD or an adaptive filter. In an embodiment, the process returns from step 208 to step 204, in which case steps 204 to 208 constitute an iterative process to be repeated one or several times.

The method can thus be implemented in several alternative ways. In an embodiment, the received signal is subjected to one multiuser interference cancellation stage, external interference being cancelled from the residual signal thus obtained, in other words, multiuser interference cancellation and external interference cancellation then reside within the same iterative process. In another embodiment, the user signals are entirely subjected to multiuser interference cancellation procedures in one or more interference cancellation stages. The signal cleaned of multiuser interference thus obtained is conveyed to external interference cancellation. End stage 230 describes exiting the iterative interference cancellation process described above, i.e. when the quality of the user signal is good enough by a known criterion, the process may proceed with other user signal processing stages.

In FIG. 2, steps 212 to 214 describe an embodiment of the method. In method step 212, external interference is cancelled from the received spread spectrum signal. The signal cleaned of external interference is conveyed to multiuser interference cancellation in step 214. External interference cancellation and multiuser interference cancellation may also in itself comprise several interference cancellation stages. In an embodiment, from the external interference cancellation the process moves to multiuser interference cancellation after the signal to noise ratio (SNR) has been successfully raised above a preset threshold value. An example of such a threshold value for the signal to noise ratio is e.g. 10 dB, but it is obvious that the threshold value may also be set differently, depending e.g. on the reception environment.

In the following, device solutions according to the preferred embodiments will be described, anteceded by a review of relevant parts of the principles of a mobile communication system. In mobile communication systems, information between a mobile communication network and a mobile station is transferred utilizing data transfer resources. The data transfer resources of a mobile communication network are determined in different ways, depending on the multiple access method of the system. Radio networks using a Frequency Division Multiple Access (FDMA) method, users are separated from each other on the basis of the frequency to be used. In radio networks using a Time Division Multiple Access (TDMA) method, several users may communicate on the same frequency band where the users are separated from each other by using time division wherein the information transmitted or received by the users is divided into time slots. In a radio system using a Code Division Multiple Access (CDMA) method, several transmitting and receiving stations communicate on the same radio spectrum frequency band simultaneously. A spread spectrum is reserved for each user for the duration of a connection to be used for spreading the information contained in the user's baseband signal. The receiver of the signal, in turn, is able to recognize the information transmitted by the user by despreading the information by utilizing a corresponding code. A radio system may also be implemented by combining multiple access methods, e.g. in a hybrid system based on the TDMA and CDMA multiple access methods, the users communicating in each time slot are separated from each other by means of spreading codes.

None of the above-described multiple access methods can guarantee an ideal and interference-free radio connection between users and a mobile communication network. In the TDMA system, for example, users communicating in adjacent time slots arid adjacent cells of the mobile communication system cause interference to each other. In the CDMA system, in turn, a disadvantage is that users operating on the same frequency band cause interference to each other's transmissions due to the non-orthogonality of spreading codes as well as the lack of synchronization between transmitters. In addition to the interference caused by the users to each other, interference is also caused to the transmission of information on a radio path e.g. by the surrounding topography. Multipath propagation means that while propagating, a user signal is reflected from several different objects such that a receiver receives several differently delayed components of the same signal. The multipath components of the signal may cause e.g. fade in a situation wherein the signal is reflected from two adjacent objects. When the fade is of considerable extent, no signal can be received at all. Interference may be caused to a radio transmission also by another radio system operating on an adjacent or even on the same frequency band; this is the result of the increasing number of users and the resulting increase in the intensity in utilizing the frequency ranges. An example of such a solution is the placement of second and third generation mobile communication networks onto the same frequency band.

The placement of mobile communication networks onto the same frequency band often means that a desired signal must be received in an environment involving interference. In a WCDMA radio system, for example, a base transceiver station uses a rake receiver based on reception taking place via one or more antennas. In a rake-type receiver, multipath propagation can be utilized by receiving several differently delayed components that are combined in order to achieve the best user signal detection. The rake receiver comprises correlators that are called branches or fingers. Each branch is used for correlating one multipath component, which gives a signal component corresponding with a particular component. Finally, the signal components obtained from different branches are combined into a user signal. Typically, for the rake reception, a delay profile, i.e. an impulse response, is formed for a radio channel. The impulse response can be formed using e.g. a matched filter (MF). The matched filter is used e.g. on a pilot channel or for information received in a pilot of a radio burst. Pilot symbols are a set of symbols known to the receiver and the transmitter, which enables the receiver of the information to estimate the quality of the radio channel used because the receiver knows what the received information should have contained. In the matched filter, convolution with the received signal and the user code is calculated e.g. a half of a spreading code chip at a time and the reception power is measured. This enables an impulse response pattern to be formed for the multipath components of the received user signal, the impulse response pattern comprising information on the signal power and delays of the multipath components. The strongest multipath components are allocated to the rake branches.

Figure 3:
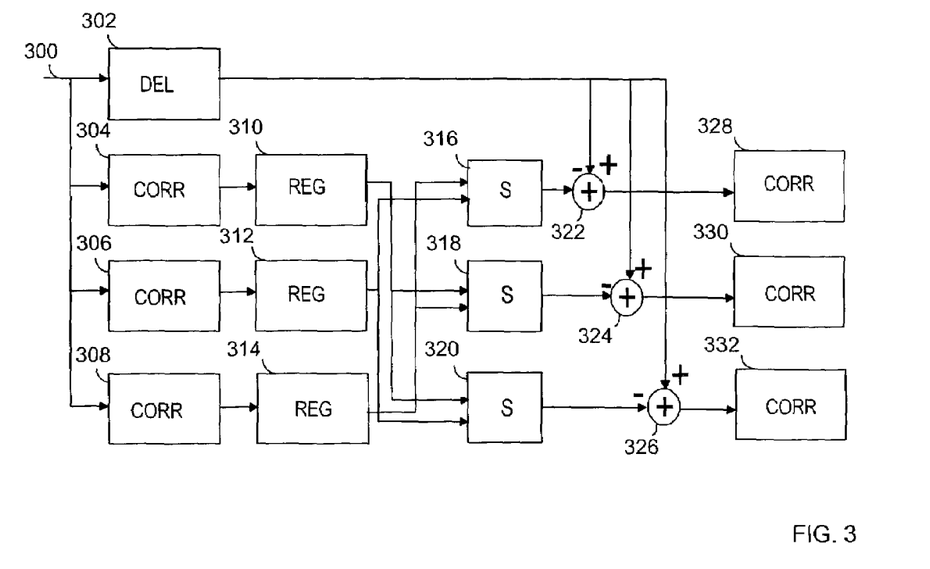
FIG. 3 illustrates an operating principle of parallel interference cancellation.

FIG. 3 shows a general principle of parallel interference cancellation. A receiver receives a broadband combination signal 300 in a first detection stage. The signal is conveyed to correlators 304 to 308, which despread the user signals by means of the user's spreading code. In the correlator 304, which can be considered to constitute a correlator bank comprising several correlators, the user signal e.g. of a user 1 is despread while, correspondingly, the user signals of users 2 and 3 are despread in the correlators 306 to 308. In the first detection stage, first symbol estimates are formed from the spread spectrum signal 300 for each user, which are conveyed to regenerators 310 to 314 of first interference cancellation stage signals. In the regenerators 310 to 314, the user signals are regenerated, i.e. re-spread, using the users' spreading codes and user signal estimates. In the regenerator 310, for example, the signal of the first user is spread using the first user's spreading code and the symbol estimates formed in the detection stage.

The user signals spread in a receiver using parallel interference cancellation are combined in adders 316 to 320 into multiuser interference signals. As far as e.g. the user 1 is concerned, the signals of the users 2 and 3 constitute multiuser interference signals, the outputs of the regenerators 312 to 314 thus being conveyed to the adder 316. The interference signal obtained as the output of the adder 316 is conveyed to a subtracter 322 wherein the multiuser interference signal is subtracted from the combination signal 300 delayed by a delay unit 302. As the output of the subtracter 322, a residual signal is obtained which is conveyed to the next despreading and regenerating stage. Adding the residual correlation values provided upon despreading the residual signal to the correlation values of the first detection stage enables improved correlation values to be achieved, which are used in generation of specified user signal estimates. A second way to generate a residual signal would be to add the outputs of the regenerators 310 to 314 into a combination signal which, in its entirety, would be subtracted from the received spread spectrum signal. In the next interference cancellation stage, this residual signal would be used as input wherefrom the user signals are detected. The user signals generated in the first stage are added to the signals thus detected.

Figure 4:
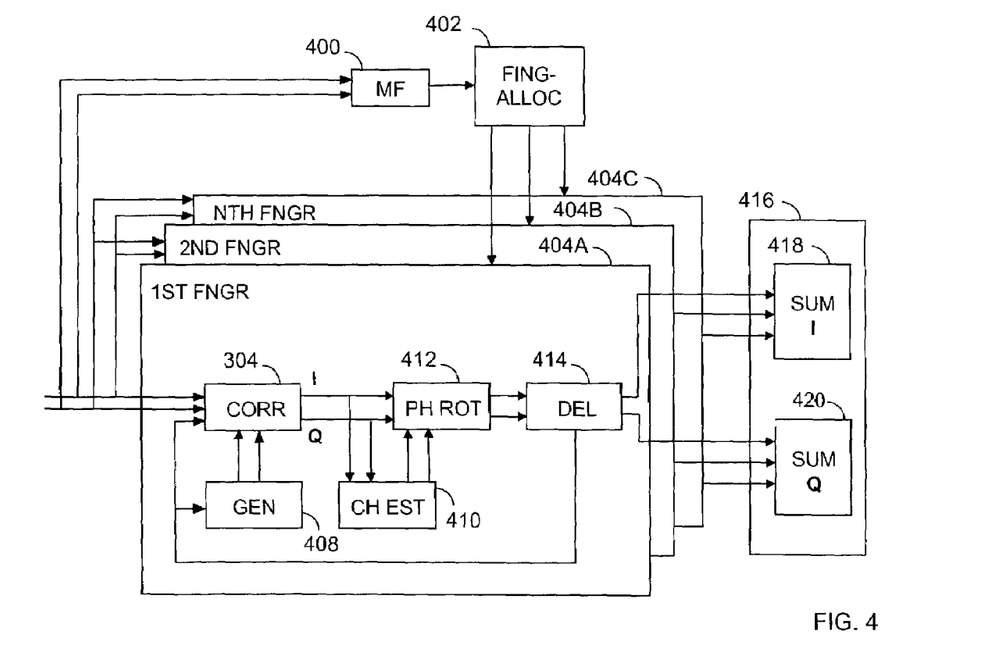
FIG. 4 shows an embodiment of a rake receiver.

As far as correlators and generation of user signal estimates are concerned, FIG. 4 describes the basic principle of a rake receiver with no interference cancellation functionality involved. A conventional WCDMA receiver typically comprises several branches, each being responsible for monitoring one multipath component of a received user signal. Due to the mobile nature of a mobile station, the propagation environment between a base transceiver station and the mobile station varies constantly and the strength and number of multipath propagated signals change along with the location of the mobile station. In the receiver, the signal is received by one or more antenna receivers and, after radio frequency parts, it is transferred to an analogue-to-digital converter, wherefrom signals modulated e.g. by QPSK modulation are obtained, having I and Q branches separated from each other.

In a searching branch, multipath components are found for the signal sampled in the A/D converter, which generation of an impulse response has been implemented e.g. as a matched filter 400. The correlator 400 residing in the searching branch in a connection set up stage tries to synchronize with the pilot bits spread by the spreading code in order to form an impulse response. In the searching branch, a relatively long matched filter 400 is used for the signal to be received in order to enable the correct phase of the spreading code to be found as quickly as possible.

The searching branch also comprises allocating means 402 which, from the impulse response formed in the matched filter 400, determine the delays of different signal components and allocate the components to be monitored by branches 404A to 404C of the receiver. The allocating means 402 recognize the strongest multipath components from the impulse response of the channel and carry out reallocation of the branches 404A to 404C if multipath components stronger than the old multipath components have been found in the impulse response of the channel. The reallocation of the branches 404A to 404C can also be carried out at regular intervals.

Each branch 404A to 404C comprises a correlator 304 and a code generator 408 for despreading one multipath component of a user signal. A channel estimator 410 utilizes pilot symbols for estimating the state of the channel, which effect of the channel can be removed from the received symbols by using a phase rotator 412. The delay of the signal is corrected by a delay unit 414, which enables the signals received in different branches to be aligned in phase to each other. A combiner 416 of the receiver combines the signals received in the different branches 404A to 404C in order to achieve multipath diversity against channel fading. In a typical rake receiver, the processing taking place at a chip level, such as correlators, code generators and matched filters, is implemented as ASIC (Application Specific Integrated Circuit) whereas the processing at a symbol level, such as channel estimation, phase rotation and combining, is implemented as DSP (Digital Signal Processing).

Figure 5:
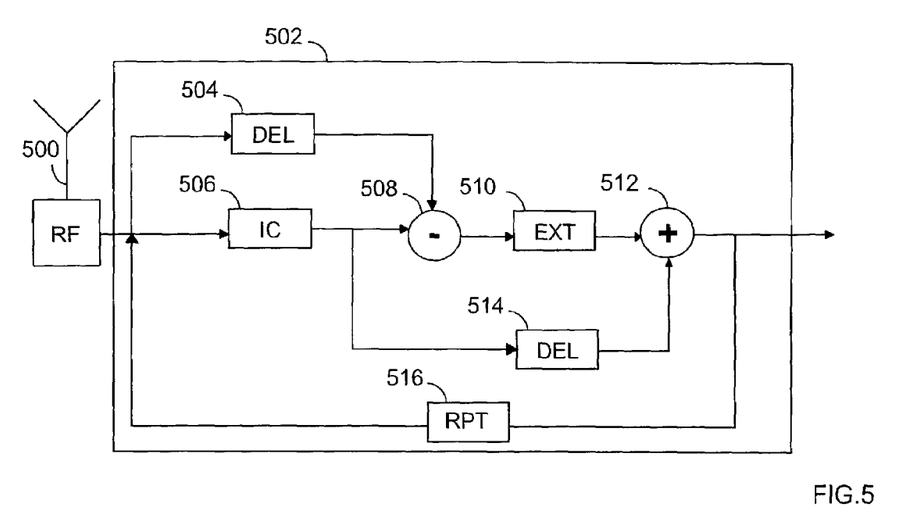
FIG. 5 shows a preferred embodiment of the receiver.

FIG. 5 describes a receiver according to a preferred embodiment. The receiver comprises reception means 500 for receiving a spread spectrum signal. The reception means comprise e.g. one or more receiving antennas, radio frequency parts and an A/D converter. From the reception means, the sampled signal is conveyed to interference cancellation means 502. The interference cancellation means 502 comprise repetition means 516 for repeating interference cancellation in one or more stages. The signal received in the interference cancellation means is conveyed to multiuser interference cancellation means 506 wherein at least some of the multiuser interference contained in the received signal is cancelled.

The combination signal generated from the user signals at least partly cleaned of multiuser interference is conveyed to a subtracter 508 wherein the combination signal is subtracted from the received spread spectrum signal in order to form a residual signal. The residual signal is conveyed to external interference cancellation means 510, which cancel an external interference signal, such as interference caused by a GSM system to a WCDMA system, from the residual signal. As an output signal, the external interference cancellation means 510 produce a second residual signal, which is transferred to combining means 512, the user signals delayed in the delay means also being conveyed thereto. The output signal of the combining means 512 is conveyed either to channel decoding or to a new interference cancellation round.

Figure 6:
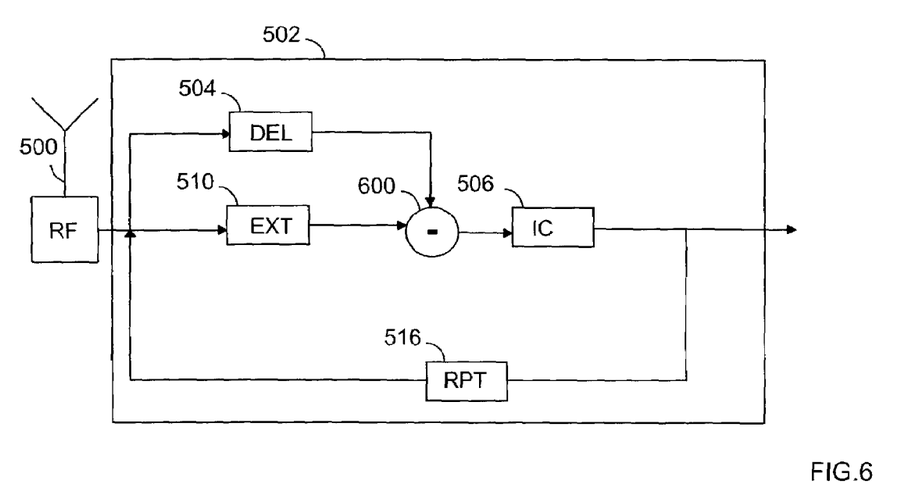
FIG. 6 shows a preferred embodiment of the receiver.

FIG. 6 describes an embodiment of a device solution. In the embodiment, the received signal is first conveyed to external interference cancellation means 510 implementing e.g. FFT interference cancellation. The signal containing external interference is conveyed to a subtracter 600 wherein the external interference is cancelled from the received signal delayed in a delay unit 504. As an output of the subtracter 600, a residual signal is obtained which is conveyed to multiuser interference cancellation means 506. External interference cancellation and multiuser interference cancellation may be implemented iteratively, in which case repetition means 516 may convey the interference-cancelled signal to a new interference cancellation round.

The invention is implemented e.g. by hardware solutions providing the required functionality, e.g. as an ASIC (Application Specific Integrated Circuit) or by utilizing separate logic components. The invention may also be implemented by software by a general-purpose processor of a receiver.

Although the invention has been described above with reference to the example according to the accompanying drawings, it is obvious that the invention is not restricted thereto but can be modified in many ways within the scope of the inventive idea disclosed in the attached claims.

The invention claimed is:

1. A method, comprising:
   receiving a spread spectrum signal comprising user signals at a receiver of a radio system; and
   subjecting the received spread spectrum signal to one or more interference cancellation stages comprising one or more multiuser interference cancellation stages and one or more external interference cancellation stages,
   wherein, when external interference is lower than multiuser interference, one or more multiuser interference cancellation stages are executed prior to the external interference cancellation stage;
   wherein, when multiuser interference is lower than external interference, one or more external interference cancellation stages are executed prior to the multiuser interference cancellation stage; and
   wherein the multiuser interference cancellation stage comprises:
      despreading the user signals in order to generate user signal estimates;
      regenerating the user signals from the user signal estimates;
      combining the regenerated user signals in order to generate a combination signal; and
      subtracting the combination signal from the received spread spectrum signal in order to generate a residual signal.

2. The method as claimed in claim 1, wherein, at the receiver, the subjecting comprises executing the one or more multiuser interference cancellation stages until an interference to signal ratio exceeds a preset threshold value.

3. The method as claimed in claim 1, wherein, at the receiver, the subjecting comprises executing the one or more external interference cancellation stages until a signal to noise ratio exceeds a preset threshold value.

4. The method as claimed in claim 1, wherein the subtracting comprises subtracting the combination signal from the received spread spectrum signal in order to generate the residual signal used in generation of final user signal estimates, in the external interference cancellation stage, or in the next multiuser interference cancellation stage.

5. A method, comprising:
   receiving a spread spectrum signal comprising user signals at a receiver of a radio system; and
   subjecting the received spread spectrum signal to one or more interference cancellation stages comprising one or more multiuser interference cancellation stages and one or more external interference cancellation stages,
   wherein, when external interference is lower than multiuser interference, one or more multiuser interference cancellation stages are executed prior to the external interference cancellation stage;
   wherein, when multiuser interference is lower than external interference, one or more external interference cancellation stages are executed prior to the multiuser interference cancellation stage; and
   wherein the multiuser interference cancellation stage comprises:
      despreading the user signals in order to generate user signal estimates;
      regenerating the user signals from the user signal estimates;
      combining, as far as detection of each user signal is concerned, signals other than a particular user's signals into a multiuser interference signal; and
      subtracting the multiuser interference signal from the received combination signal in order to generate a residual signal.

6. A receiver in a spread spectrum system, comprising:
   a reception device configured to receive a spread spectrum signal; and
   an interference cancellation device configured to cancel multiuser interference and external interference from the received spread spectrum signal in one or more interference cancellation stages,
   wherein the interference cancellation device is configured to cancel multiuser interference prior to external interference cancellation when external interference is lower than multiuser interference;
   wherein the interference cancellation device is configured to cancel external interference prior to multiuser interference cancellation when multiuser interference is lower than external interference; and wherein the interference cancellation device, in connection with multiuser interference cancellation, are configured to:

despread user signals in order to generate user signal estimates;

regenerate the user signals from the user signal estimates;

combine the regenerated user signals in order to generate a combination signal; and subtract the combination signals from the received spread spectrum signal in order to generate a residual signal to be used in generation of final user signal estimates, or in the next interference cancellation stage.

7. The receiver as claimed in claim 6, wherein the interference cancellation device, in the interference cancellation stage, is configured to cancel multiuser interference from the received spread spectrum signal until an interference to signal ratio exceeds a preset threshold value, and the interference cancellation device, after the threshold value has been exceeded in the interference cancellation stage, is configured to cancel external interference from the received signal.

8. The receiver as claimed in claim 6, wherein the interference cancellation device, in the interference cancellation stage, is configured to cancel external interference from the received spread spectrum signal until a signal to noise ratio exceeds a preset threshold value, and the interference cancellation device, after the threshold value has been exceeded in the interference cancellation stage, is configured to cancel multiuser interference from the received signal.

9. The receiver as claimed in claim 6, wherein the receiver is a base transceiver station receiver according to a wideband code division multiple access radio system, and that the external interference is at least partly interference caused by a global system for mobile communication system.

10. A receiver in a spread spectrum system, comprising:

a reception device configured to receive a spread spectrum signal; and an interference cancellation device configured to cancel multiuser interference and external interference from the received spread spectrum signal in one or more interference cancellation stages, wherein the interference cancellation device is configured to cancel multiuser interference prior to external interference cancellation when external interference is lower than multiuser interference;

wherein the interference cancellation device is configured to cancel external interference prior to multiuser interference cancellation when multiuser interference is lower than external interference; and wherein the interference cancellation device, in connection with multiuser interference cancellation, is configured to:

despread user signals in order to generate user signal estimates;

regenerate the user signals from the user signal estimates;

combine, as far as detection of each user signal is concerned, signals other than a particular user's signals into a multiuser interference signal; and subtract the multiuser interference signal from the received combination signal in order to generate a residual signal to be used in generation of final user signal estimates, or in the next interference cancellation stage.

11. A receiver in a spread spectrum system, comprising:

reception means for receiving a spread spectrum signal; and interference cancellation means for canceling multiuser interference and external interference from the received spread spectrum signal in one or more interference cancellation stages, wherein the interference cancellation means is configured to cancel multiuser interference prior to external interference cancellation when external interference is lower than multiuser interference;

wherein the interference cancellation means is configured to cancel external interference prior to multiuser interference cancellation when multiuser interference is lower than external interference; and wherein the interference cancellation means, in connection with multiuser interference cancellation, are configured to:

despread user signals in order to generate user signal estimates;

regenerate the user signals from the user signal estimates;

combine the regenerated user signals in order to generate a combination signal; and subtract the combination signals from the received spread spectrum signal in order to generate a residual signal to be used in generation of final user signal estimates, or in the next interference cancellation stage.

12. An apparatus, comprising:

a processor configured to process a spread spectrum signal; and an interference cancellation device configured to cancel multiuser interference and external interference from the processed spread spectrum signal in one or more interference cancellation stages, wherein the interference cancellation device is configured to cancel multiuser interference prior to external interference cancellation when external interference is lower than multiuser interference;

wherein the interference cancellation device is configured to cancel external interference prior to multiuser interference cancellation when multiuser interference is lower than external interference; and wherein the interference cancellation device, in connection with multiuser interference cancellation, are configured to:

despread user signals in order to generate user signal estimates;

regenerate the user signals from the user signal estimates;

combine the regenerated user signals in order to generate a combination signal; and subtract the combination signals from the received spread spectrum signal in order to generate a residual signal to be used in generation of final user signal estimates, or in the next interference cancellation stage.

13. A receiver in a spread spectrum system, comprising:

reception means for receiving a spread spectrum signal; and interference cancellation means for canceling multiuser interference and external interference from the received spread spectrum signal in one or more interference cancellation stages, wherein the interference cancellation means is configured to cancel multiuser interference prior to external interference cancellation when external interference is lower than multiuser interference;

wherein the interference cancellation means is configured to cancel external interference prior to multiuser interference cancellation when multiuser interference is lower than external interference; and wherein the interference cancellation means, in connection with multiuser interference cancellation, is configured to:

despread user signals in order to generate user signal estimates;

regenerate the user signals from the user signal estimates;

combine, as far as detection of each user signal is concerned, signals other than a particular user's signals into a multiuser interference signal; and subtract the multiuser interference signal from the received combination signal in order to generate a residual signal to be used in generation of final user signal estimates, or in the next interference cancellation stage.

14. An apparatus, comprising:

a processor configured to process a spread spectrum signal; and an interference cancellation device configured to cancel multiuser interference and external interference from the processed spread spectrum signal in one or more interference cancellation stages, wherein the interference cancellation device is configured to cancel multiuser interference prior to external interference cancellation when external interference is lower than multiuser interference;

wherein the interference cancellation device is configured to cancel external interference prior to multiuser interference cancellation when multiuser interference is lower than external interference; and wherein the interference cancellation device, in connection with multiuser interference cancellation, is configured to:

despread user signals in order to generate user signal estimates;

regenerate the user signals from the user signal estimates;

combine, as far as detection of each user signal is concerned, signals other than a particular user's signals into a multiuser interference signal; and subtract the multiuser interference signal from the received combination signal in order to generate a residual signal to be used in generation of final user signal estimates, or in the next interference cancellation stage.

* * * * *